United States Patent
Di Febbo et al.

(10) Patent No.: US 12,135,993 B2
(45) Date of Patent: *Nov. 5, 2024

(54) HYBRID MEMORY IN A DYNAMICALLY POWER GATED HARDWARE ACCELERATOR

(71) Applicant: Apple Inc., Cupertino, CA (US)

(72) Inventors: Paolo Di Febbo, Redwood City, CA (US); Yohan Rajan, Cupertino, CA (US); Chaminda Nalaka Vidanagamachchi, San Jose, CA (US); Anthony Ghannoum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,919

(22) Filed: May 23, 2023

(65) Prior Publication Data
US 2023/0409397 A1  Dec. 21, 2023

Related U.S. Application Data

(63) Continuation of application No. 16/919,930, filed on Jul. 2, 2020, now Pat. No. 11,693,699.

(51) Int. Cl.
*G06F 9/50* (2006.01)
*G06F 9/30* (2018.01)

(52) U.S. Cl.
CPC .......... *G06F 9/5016* (2013.01); *G06F 9/3004* (2013.01); *G06F 9/5044* (2013.01)

(58) Field of Classification Search
CPC .... G06F 9/5016; G06F 9/3004; G06F 9/5044; G06F 12/023; G06F 2212/205; G06F 1/3275; G06F 9/3881

(Continued)

(56) References Cited

U.S. PATENT DOCUMENTS

| | | | |
|---|---|---|---|
| 2009/0089562 A1* | 4/2009 | Schuchman | G06F 1/324 712/228 |
| 2015/0081980 A1* | 3/2015 | Walker | G06F 12/0802 711/135 |

(Continued)

OTHER PUBLICATIONS

DarkMem: Fine-Grained Power Management of Local Memories for Accelerators in Embedded Systems Christian Pilato; Luca P. Carloni (Year: 2018).*

*Primary Examiner* — Gautam Sa
*Assistant Examiner* — Wei Ma
(74) *Attorney, Agent, or Firm* — Kowert, Hood, Munyon, Rankin & Goetzel, P.C.; Dean M. Munyon

(57) ABSTRACT

In an embodiment, a local memory dedicated to one or more hardware accelerators in a system may include at least two portions: a volatile portion and a non-volatile portion. Data that is reused from iteration to iteration of the hardware accelerator (e.g. constants, instruction words, etc.) may be stored in the non-volatile portion. Data that varies from iteration to iteration may be stored in the volatile portion. Both the local memory and the hardware accelerators may be powered down between iterations, saving power. The non-volatile portion need only be initialized at a first iteration, allowing the amount of time that the hardware accelerators and the local memory are powered up to be lessened for subsequent iterations since the reused data need not be reloaded in the subsequent iterations.

20 Claims, 10 Drawing Sheets

(58) Field of Classification Search
USPC .......................................................... 711/170
See application file for complete search history.

(56) References Cited

U.S. PATENT DOCUMENTS

| | | |
|---|---|---|
| 2016/0379115 A1 | 12/2016 | Burger et al. |
| 2018/0189638 A1 | 7/2018 | Nurvt)/itadhi et al. |
| 2019/0042930 A1 | 2/2019 | Pugsley et al. |
| 2019/0073585 A1 | 3/2019 | Pu et al. |
| 2019/0341091 A1 | 11/2019 | Sity et al. |
| 2021/0295137 A1* | 9/2021 | Thakker .............. G06F 12/0207 |

* cited by examiner

Computer Accessible Storage Medium 200

SOC 204

FIG. 13

HYBRID MEMORY IN A DYNAMICALLY POWER GATED HARDWARE ACCELERATOR

The present application is a continuation of U.S. application Ser. No. 16/919,930, entitled "Hybrid Memory in a Dynamically Power Gated Hardware Accelerator," filed Jul. 2, 2020, the disclosure of which is incorporated by reference herein in its entirety.

BACKGROUND

Technical Field

Embodiments described herein are related to hardware accelerators in digital systems that include a local memory.

Description of the Related Art

Hardware accelerators can be included in various computing systems to perform specific tasks at higher performance and/or higher efficiency than can typically be achieved in software executing on processors in the system (e.g. on central processing units, or CPUs, in the system). For example, neural networks (or operations that are performed frequently in the evaluation of neural networks) are frequently implemented in hardware accelerators. As another example, processing of photographical data such as photos or videos can be accelerated. Various subsets of processing operations can be accelerated. Network processing can be accelerated.

In some cases, the data to be operated upon by the accelerator is provided at a predictable or regular rate. For example, video data arrives at a certain frame rate. If the frame rate is 30 frames per second, a frame of data is provided about once every 33 milliseconds. If the accelerator does not require all of the time between data delivery to process the frames, then it is idle for a portion of the time. Powering down the accelerator (e.g. power gating the accelerator) when it is idle would reduce power consumption. If the accelerator has a local memory attached, power gating the local memory would further reduce power consumption. However, the local memory often stores instructions, constants, and other data that is reused each time the accelerator evaluates the data. If the accelerator and local memory are power gated, the reusable data would need to be reloaded each time data arrives for processing, lengthening the amount of time that the accelerator operates.

SUMMARY

In an embodiment, a local memory dedicated to one or more hardware accelerators in a system may include at least two portions: a volatile portion and a non-volatile portion. Data that is reused from iteration to iteration of the hardware accelerator (e.g. constants, instruction words, etc.) may be stored in the non-volatile portion. Data that varies from iteration to iteration may be stored in the volatile portion. Both the local memory and the hardware accelerators may be powered down between iterations, saving power. The non-volatile portion need only be initialized at a first iteration, allowing the amount of time that the hardware accelerators and the local memory are powered up to be lessened for subsequent iterations since the reused data need not be reloaded in the subsequent iterations.

BRIEF DESCRIPTION OF THE DRAWINGS

The following detailed description refers to the accompanying drawings, which are now briefly described.

FIG. 13 is a block diagram of one embodiment of a computer accessible storage medium.

Figure 1:
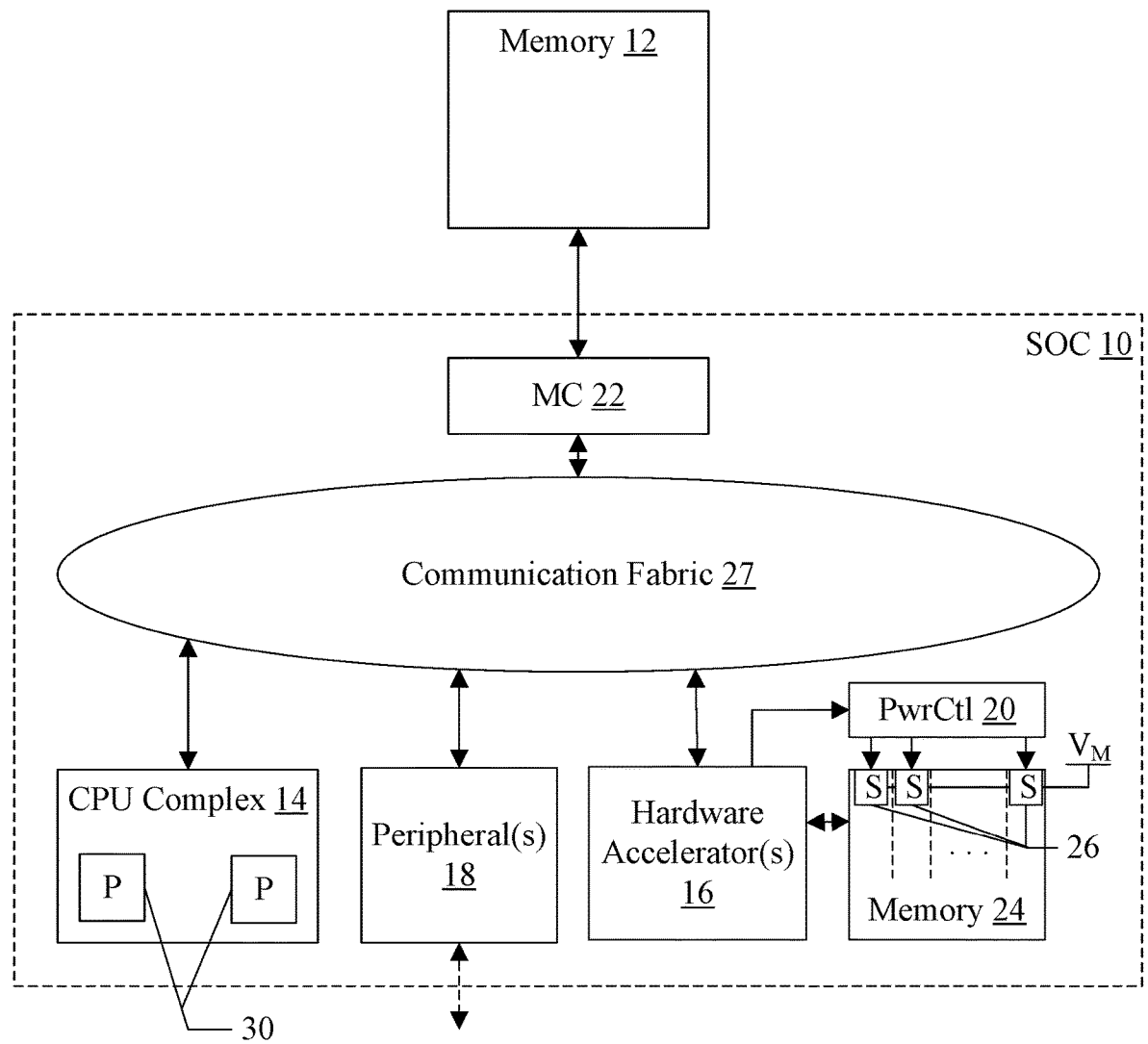
FIG. 1 is a block diagram of one embodiment of a system on a chip (SOC) having one or more hardware accelerators.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Similarly, as used herein, the term "responsive to" or "in response to" is used to describe one or more factors that may contribute to causing a result. This term does not foreclose the possibility that additional factors may affect the causation, either independently or jointly with the specified factors. That is, a result may be solely responsive to the specified factors or responsive to the specified factors and/or other, unspecified factors. Consider the phrase "perform A responsive to B." This phrase specifies that B is a factor in causing A or that affects the causation of A. This phrase does not foreclose that the causation of A may responsive to some other factor, such as C, independent of B or jointly with B. This phrase is also intended to cover an embodiment in which A is caused solely responsive to B. As used herein, the phrase "responsive to" is synonymous with the phrase "responsive at least in part to." Similarly, the phrase "in response to" is synonymous with the phrase "at least in part in response to."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of an SOC 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, one or more peripheral components 18 (more briefly, "peripherals"), a memory controller 22, one or more hardware accelerators 16, a power control circuit 20, a local memory 24, and a communication fabric 27. The components 14, 16, 18, and 22 may all be coupled to the communication fabric 27. The memory controller 22 may be coupled to the memory 12 during use. The hardware accelerator 16 is coupled to the power control circuit 20, both of which are coupled to the memory 24.

The hardware accelerator(s) 16 may be configured to perform a predefined set of operations based on instruction words received from the processors 30 in the CPU complex 14. That is, a given instruction word may be a command from the CPU processor 30 to perform the predefined set of operations. The operations vary from accelerator to accelerator. For example, a neural network hardware accelerator may be configured to evaluate a set of activations against a neural network model. The activations may be one layer of the network, and additional instruction words may cause the activations resulting from one layer to be applied to the next layer in the neural network. Alternatively, one command/ instruction word may cause the evaluations to occur at each layer until the end result of the network is achieved. As another example, the accelerator may be configured to perform a specific set of mathematical operations (e.g. multiply-accumulate operations) or operate on a specific data type (e.g. floating point, vector, or matrix). The predefined operations may apply the set of operations to a set of input data. In still another example, the hardware accelerators may be specialized for particular functions within the system. For example, there may be various types of video processing accelerators, such as graphics processing units (GPUs) targeted at accelerating graphics functions such as rendering scenes for display, image signal processors configured to process camera data into specific image formats and/or perform image recognition operations on the data, video accelerators of various types such as codecs, hardware scalar/rotator functions, etc. The accelerators may be specialized for audio processing (e.g. audio codes, etc.) or any digital signal processing (e.g. digital signal processors, or DSPs). Network accelerators may accelerate network processing functions (e.g. network processors). Any set of hardware accelerators 16 may be supported in various embodiments.

The data used by the hardware accelerators 16 and/or produced by the hardware accelerators 16 may be stored in the local memory 24. That is, the local memory 24 may be dedicated to the hardware accelerators 16, accessible to the hardware accelerators 16 but not accessible to other devices in the system. The hardware accelerators 16 may load data into the local memory 24 (e.g. from the external memory 12, or from sensors in the system, not shown in FIG. 1) and may write result data form the local memory 24 to the external memory 12 or other storage (if the result data may be accessed by another component in the system).

In some embodiments, the memory 24 may also store the instruction words. A processor 30 may direct the hardware accelerator 16 to perform an instruction word or words by providing a pointer to the instruction word(s) to be executed. Alternatively, a data structure in the memory 12 may be written by a processor 30 to instruct the hardware accelerator 16 to perform instruction words. The hardware accelerator 16 may poll the data structure waiting for commands, or may be powered up from a powered down state to perform instruction words. Thus, the hardware accelerator 16 may be coupled to the processors (e.g. through the communication fabric 27) and may receive instruction words from the processors over the fabric 27, or may receive the instruction words through the memory 12 or through the local memory 24, in various embodiments.

In the illustrated embodiment, the memory 24 is divided into a plurality of sections, or partitions. The plurality of sections may be individually powerable, or independently powerable. In other words, one or more of the plurality of sections may be powered on while other ones of the plurality of sections are powered off. In the embodiment of FIG. 1, the sections of the memory 24 are illustrated with vertical dashed lines. A given section may include one or more power switches (e.g. power switches 26 in each section shown in FIG. 1) coupled between the memory cells in the given section and a power supply (e.g. $V_M$ in FIG. 1). The power control circuit 24 may be coupled to the power switches 26 and may be configured to control the one or more power switches to selectively power the given section. For example, the power switches may comprise one or more transistors that may be activated by the power control circuit 20 to connect the power supply $V_M$ to the memory cells in a given section of the memory 24. The power control circuit 20 may deactivate the transistors to disconnect the power supply $V_M$ from the memory cells, allowing the memory cells to power down and lose their contents.

The power control circuit 20 may selectively power the plurality of sections of the memory 24, ensuring that there is sufficient memory for the hardware accelerator 16 to perform the requested operations while also not unnecessarily powering on sections that may not be used during the processing. The sections may be of any desired size and may contain any arrangement of memory cells. For example, a given section may be a bank of memory, or several banks of memory. Larger sized sections may reduce the complexity of the memory 24 and/or may reduce the number of power switches 26 used in the design, but may also have less granularity than in an implementation that has smaller sized sections.

A given instruction word provided to the hardware accelerator 16 may include a field that specifies the amount of memory to be powered on during processing of the instruction word. The amount may be specified in any desired fashion. For example, the amount may be a size that will be consumed and/or produced by the instruction word, and the size may be decoded to determine the number of memory sections to power on to ensure that at least the specified number of bytes are available. For example, the size may be a measurement of the number of bytes, or an encoded value representing the number of bytes such a selecting among a set of predetermined numbers of bytes. Such an implementation of the field may be agnostic to the memory 24 implementation (e.g. the size and organization of the memory sections) and thus may be portable to different implementations of the memory 24. In other embodiments, the field may directly specify the number of sections to power on, or may directly specify which subset of the sections to power on and other sections that are powered off. For example, the field may be a bit field having a bit for each section, with a one indicating the section is powered on and a zero indicating the section is powered off (or vice versa).

The hardware accelerator 16 may be coupled to the power control circuit 20 and may provide the field from an instruction word being executed by the hardware accelerator 16. When the hardware accelerator 16 completes an instruction word and beings processing another instruction word, the field from the new instruction word may be provided by the hardware accelerator 16. The power control circuit 20 may be configured to adjust the powered on sections based on the newly received field, retaining power to one or more of the plurality of sections that are powered on based on both the previous field and the new field and powering on or off other sections to satisfy the new field. Accordingly, the power control circuit 20 may power on a subset of the sections and power off remaining sections based on the field of the instruction word. The is, the power control circuit may be configured to independently control power to the plurality of sections of the memory as specified by the field in the instruction word.

It is noted that the power control circuit 20 is shown as a separate component from the hardware accelerators 16 in FIG. 1 for clarity and ease of understanding. In some embodiments the power control circuit 20 may be integrated into the hardware accelerators 16. Particularly, if the memory 24 is dedicated to a single hardware accelerator 16, the power control circuit 20 may be integrated into the hardware accelerator 16. In other embodiments, the power control circuit 20 may be separate. For example, if the power control circuit 20 is shared by multiple hardware accelerators 16, the power control circuit 20 may be implemented separately (see, e.g., FIG. 7).

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the peripherals 18, and the CPU complex 14, the memory controller 22, the hardware accelerator(s) 16, the power control circuit 20, and the memory 24 may each be examples of a component.

A component may be active if it is powered up and not clock gated. Thus, for example, a processor in the CPU complex 14 may be available for instruction execution if it is active. A component may be inactive if it is powered off or in another low power state in which a significant delay may be experienced before the component may operate and interact with other components. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc.

Accordingly, the processors may also be referred to as application processors. The CPU complex 14 may further include other hardware such as an L2 cache and/or an interface to the other components of the system (e.g. an interface to the communication fabric 27).

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/ mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
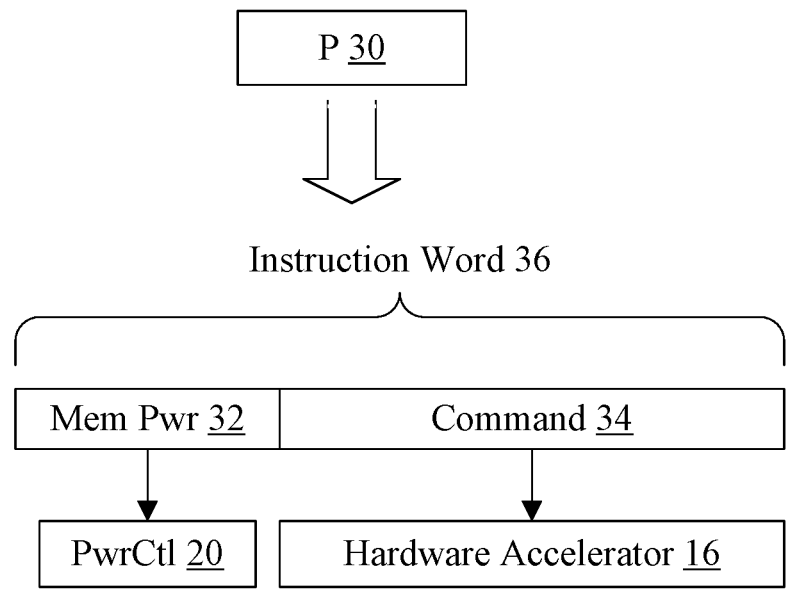
FIG. 2 is a block diagram of one embodiment of an instruction word that may be processed by a hardware accelerator.

Turning now to FIG. 2, a block diagram of one embodiment of an instruction word 36 that may be generated by a CPU processor 30 and provided to a hardware accelerator 16 and power control circuit 20 is shown. In the illustrated embodiment, the instruction word 36 comprises a memory power field 32 and a command field 34. The memory power field 32 may be provided to the power control circuit 20 during execution of the instruction word 36, and the command field 34 may be provided to the hardware accelerator 16. In some embodiments, the memory power field 32 may be provided to the hardware accelerator 16 as well (e.g. for error checking on addresses for the memory 24 that are generated during processing of the command field 34).

The command field 34 may be any specification of a command or commands to be performed. For example, in an embodiment, the command field 34 may be a very long instruction word (VLIW) form that specifies multiple operations to be performed by the hardware accelerator 16. The multiple operations, when complete, result in the completion of the set of predefined operations implemented by the hardware accelerator 16. For example, in some embodiments, the VLIW word may be 128 bits or 256 in size, although larger or smaller VLIW words may be used in other embodiments. Alternatively, the command field 34 may be a single command that is decoded by the hardware accelerator 16, which may perform the predefined set of operations. Generally, the predefined set of operations may be performed over multiple clock cycles (and thus the power configuration for the memory 24 may be in place for multiple clock cycles). For example, performing the predefined set of operations may occupy tens or hundreds of clock cycles, or even more clock cycles, as desired.

The memory power field 32 may specify the amount of the memory 24 to be powered up during processing of the instruction word 36. As mentioned previously, the memory power field 32 may be any representation of the amount of memory 24. For example, the memory power field 32 may encode the size of the memory (e.g. as represented in bytes or an encoded value representing the number of bytes), and a sufficient number of sections in the memory 24 may be powered up to supply at least the specified number of bytes. In other embodiments, the memory power field 32 may directly identify the sections to be powered up and powered down (e.g. a bit field with a bit per section, a start and end section number, etc.).

Figure 3:
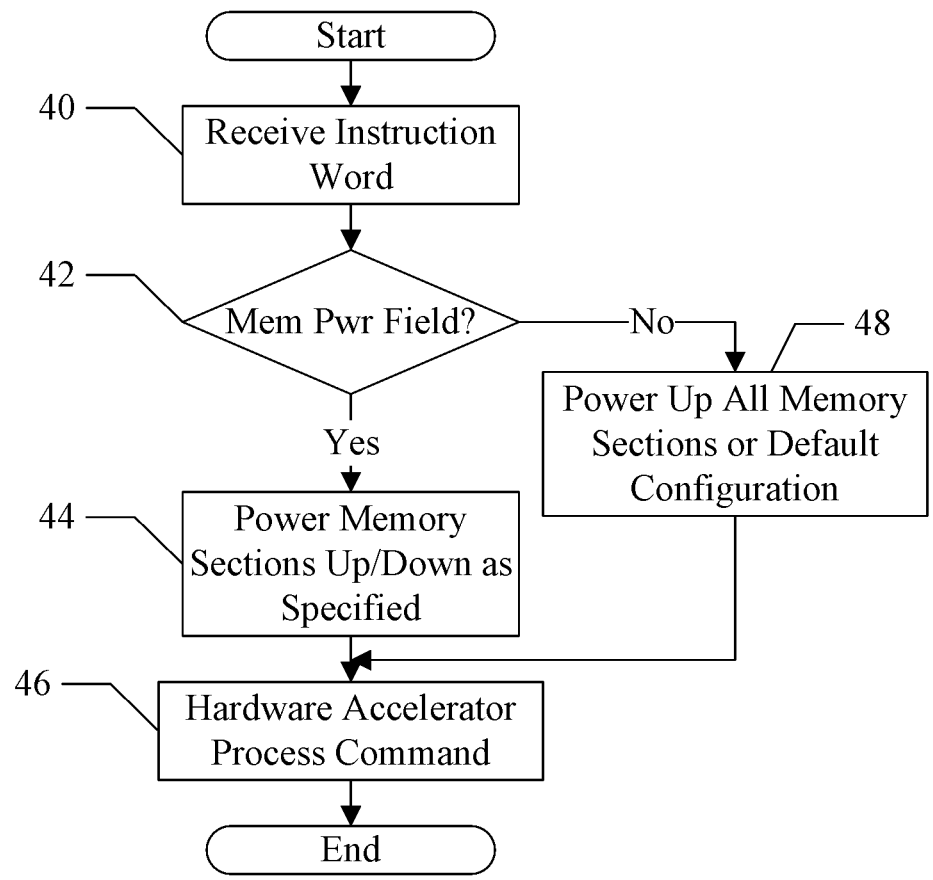
FIG. 3 is a flowchart illustrating certain operation of one embodiment of a hardware accelerator.

FIG. 3 is a flowchart illustrating operation of one embodiment of a hardware accelerator 16 and a power control circuit 20. While the blocks are shown in a particular order for ease of understanding, other orders may be used. Blocks or a series of blocks may be independent of each other and may be performed in either order or in parallel. Blocks may be performed in parallel in combinatorial logic circuitry in the hardware accelerator 16/power control circuit 20. Blocks, combinations of blocks, and/or the flowchart as a whole may be pipelined over multiple clock cycles. The hardware accelerator 16/power control circuit 20 may be configured to implement the operation shown in FIG. 3.

The hardware accelerator 16/power control circuit 20 may receive an instruction word for execution (block 40). As mentioned previously the instruction word may be received from the communication fabric 27 in the hardware accelerator 16, received through the memory 12, or provided in the memory 24 and received as a pointer or other identifier of the location in the memory 24, as various examples.

If the instruction word includes a memory power field 32 (decision block 42, "yes" leg), the power control circuit 20 may power up or power down the memory sections of the memory 24 as specified by the memory power field 32 (block 44). That is, a subset of the memory sections may be powered up, and a remaining subset of the memory sections may be powered down. Viewed in another way, the power control circuit 20 may be configured to adjust which of the sections are powered up and which are powered down from a previous instruction word. Some sections that were powered up for the previous instruction word and are powered up for the current instruction word remain powered up, while sections that were powered up for the previous instruction word but powered down for the current instruction word are powered down. Data that is in sections that remain powered may be shared between the two instruction words, or a section that remains powered between the previous instruction word and the current instruction word may be used to store results and the hardware accelerator 16 may overwrite the data from the previous instruction word with results from the current instruction word when processing the current instruction word. Similarly, some sections that were powered down for the previous instruction word and are powered down for the current instruction word remain powered down, while sections that were powered down for the previous instruction word and powered up for the current instruction word are powered up. Once the power up/power down configuration of the memory 24 is established, the hardware accelerator 16 may process the command field 34 of the instruction word, using the powered up memory sections (block 46). It is noted that the memory sections that are newly powered up for processing the instruction word need not be initialized, in this embodiment. In some cases, the newly powered up sections may be used for results and thus may be written by the hardware accelerator 16 before being read. In other embodiments, a section that is newly powered up may be initialized (e.g. to zero). In still other embodiments, the command field 34 may cause the hardware accelerator 16 to load data into a newly powered up section (e.g. from the memory 12 or another source) before reading the newly powered up section.

If the instruction word does not include a memory power field 32 (decision block 42, "no" leg), the power control circuit 20 may be configured to power up all of the memory sections (or a default configuration of the sections) (block 48). The instruction word may "not include a memory power field 32" if the field is missing from the instruction word 36 or, in some embodiments, if the field is a predefined value indicating not populated (e.g. all zeros). A programmer/compiler may choose to code an instruction word 36 with no memory field if the programmer/compiler is unsure of how much memory might be needed (and thus powering up all of the memory is possibly best), for example. If a default configuration is used, the configuration may programmable in the power control circuit 20 or the hardware accelerator 16 prior to sending instruction words to the hardware accelerator 16 (e.g. during boot of the SOC 10). The hardware accelerator 16 may process the command field 34 of the instruction word (block 46).

Figure 4:
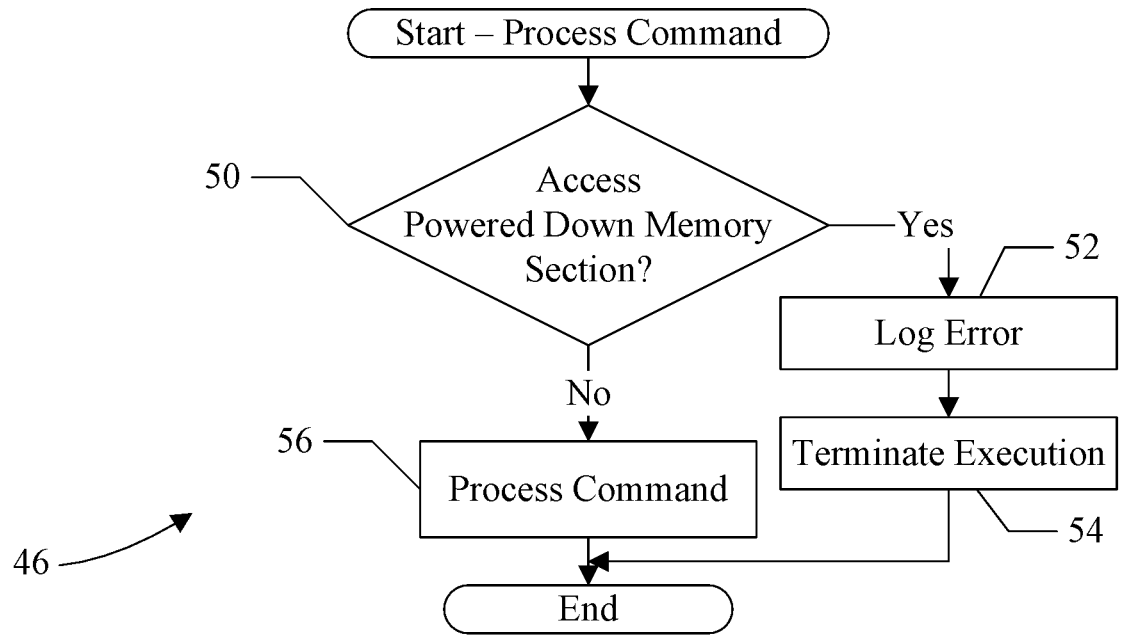
FIG. 4 is a flowchart illustrating one embodiment of a command processing block from FIG. 3 in greater detail.

FIG. 4 is a flowchart illustrating operation of one embodiment of the hardware accelerator 16 processing the command field 34 of the instruction word 36 (e.g. block 46 in FIG. 3). While the blocks are shown in a particular order for ease of understanding, other orders may be used. Blocks or a series of blocks may be independent of each other and may be performed in either order or in parallel. Blocks may be performed in parallel in combinatorial logic circuitry in the hardware accelerator 16. Blocks, combinations of blocks, and/or the flowchart as a whole may be pipelined over multiple clock cycles. The hardware accelerator 16 may be configured to implement the operation shown in FIG. 4.

In the illustrated embodiment, the hardware accelerator 16 may be configured to detect an access to one of the powered-down memory sections in the plurality of memory sections of the memory 24 (decision block 50). Thus, in this embodiment, hardware protection against access powered-down memory may be provided. In other embodiments, the compiler or an application programming interface (API) for the hardware accelerator may check for accesses to powered-down memory in software, and hardware protection may not be needed.

If the hardware accelerator 16 detects an access to a powered-down memory section (decision block 50, "yes" leg), the hardware accelerator 16 may log an error (block 52) and may terminate execution of the instruction word (block 54). In this fashion, the hardware accelerator may prevent the access to the powered-down memory section. The error may be logged in a status register or the like within the hardware accelerator 16, or may be written to a predetermined memory location in the memory 24 or the memory 12, in various embodiments. Alternatively, an interrupt may be signaled to the source CPU processor 30 to log the error.

Figure 5:
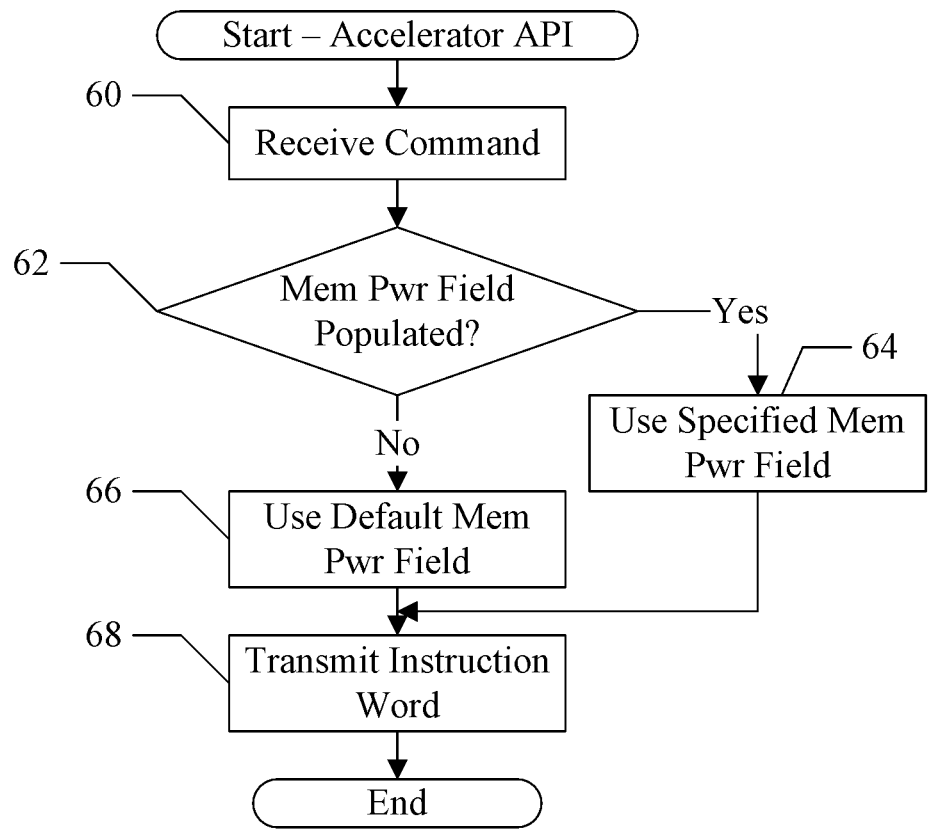
FIG. 5 is a flowchart illustrating one embodiment of an application programming interface (API) for a hardware accelerator.

FIG. 5 is a flowchart illustrating operation of one embodiment of an API that may be used by an application executing on a CPU processor 30 to issue an instruction word to the hardware accelerator 16. While the blocks are shown in a particular order for ease of understanding, other orders may be used. Blocks or a series of blocks may be independent of each other and may be performed in either order or in parallel. Blocks, combinations of blocks, and/or the flowchart as a whole may be performed over multiple clock cycles.

The API may receive a command to be performed by the hardware accelerator 16 (block 60). The command may be provided by to the API already coded in the format of the command field 34, or may be specified in some other fashion that is convenient for communication between the API and the application (e.g. a text based name, a numerical value assigned to the desired command, etc.). If the application provides a memory power field 32 (or some convenient representation of the memory power field 32) corresponding to the command (e.g. the memory power field is populated by the application—decision block 62, "yes" leg), the API may use the specified memory power field 32 as part of the instruction word 36. If the memory power field is not populated by the application (decision block 62, "no" leg), the API may populate the memory power field instruction word with a default memory power field specifying a default configuration of the memory 24 (e.g. default powered up section/powered down section configuration). In an embodiment, the default may be to power up all the sections of the memory 24. In another embodiment, a default that does not include all of the sections being powered up may be used. In either case, the API may form an instruction word 36 with the memory command field 32 determined above and the command field 34 provided or specified by the application, and may transmit the instruction word to the hardware accelerator 16 (block 68).

Figure 6:
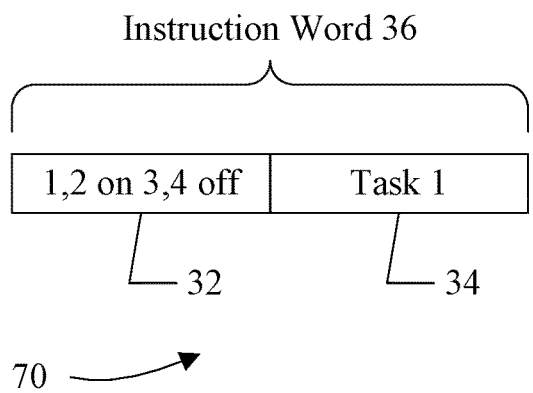
FIG. 6 is a block diagram illustrating local memory usage over several tasks for one embodiment.
Figure 6:
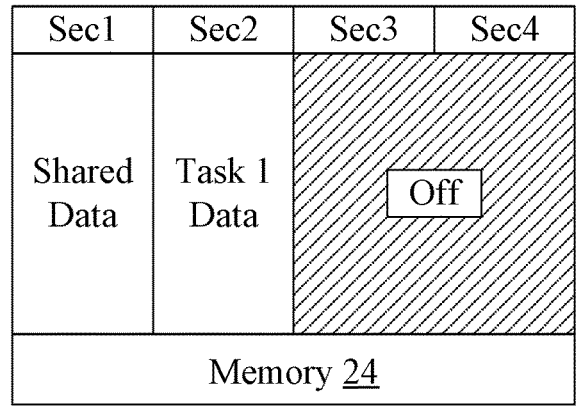
Figure 6:
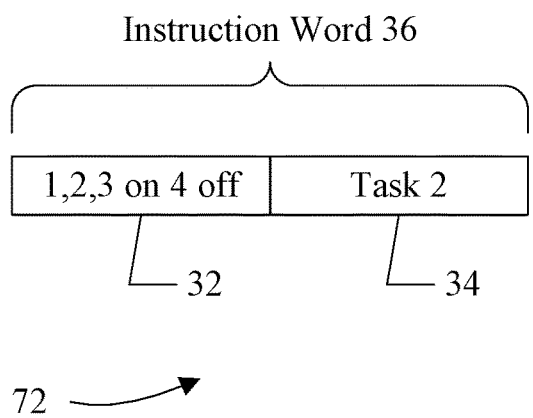
Figure 6:
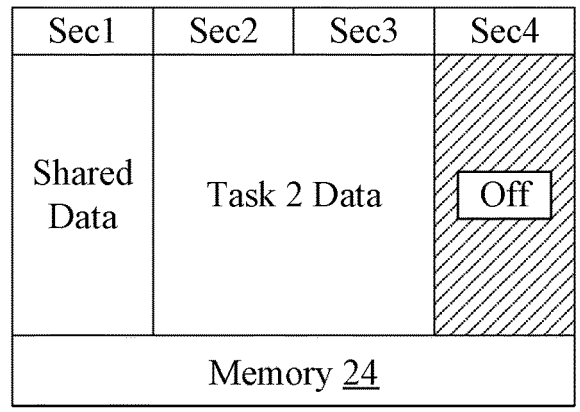
Figure 6:
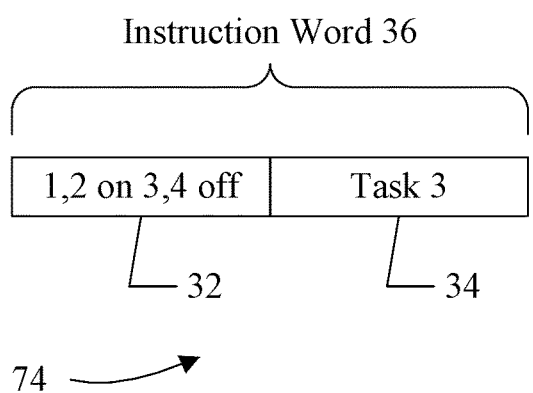
Figure 6:
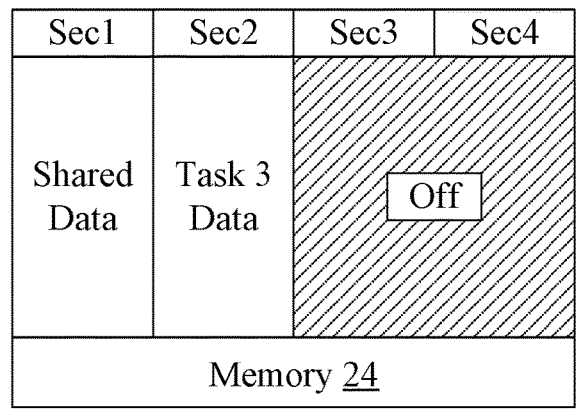

FIG. 6 illustrates an example of three consecutive tasks (Task 1, Task 2, and Task 3, illustrated generally at reference numerals 70, 72, and 74 respectively). The tasks may be performed consecutively on a hardware accelerator 16 from top to bottom in the example of FIG. 6 (e.g. 70, followed by 72, followed by 74) based on instruction words 36 that include a command field 34 specifying Task 1, Task 2, and Task 3 respectively. An example memory 24 having four sections (Sec1, Sec2, Sec3, and Sec4) is also shown for each of the tasks at 70, 72, and 74. While four sections is used as an example, memory 24 may include any number of sections as previously mentioned.

The memory power field 32 is illustrated in each instruction word 36. For task 1, the memory power field 32 specifies sections 1 and 2 on, and sections 3 and 4 off. Task 2 has a larger data footprint, and thus the memory power field 32 for task 2 specifies sections 1, 2, and 3 on, and section 4 off. The memory power field 32 for task 3 specifies sections 1 and 2 on, and sections 3 and 4 off. The off sections for each task are illustrated as the cross hatched portions of memory 24 at 70, 72, and 74 in FIG. 6. Accordingly, section 4 remains powered off throughout the three tasks in the example. Section 3 is powered off for task 1, but then is powered up for task 2 and then powered down again for task 3. Sections 1 and 2 remain powered throughout the three tasks in the example.

As illustrated in the memory 24 at each reference numeral 70, 72, and 74, section 1 in this example may be dedicate to shared data that is used by each of the tasks. The shared data may be any data in various embodiments. For example, constants used by the hardware accelerator 16 may be shared among the tasks. The constants may be weights for a neural network model, if the hardware accelerator is a neural network accelerator and the tasks are activation for the neural network, for example. The constants may be related to desire aspect ratios, resolutions, frame rates, etc. for a hardware accelerator that is accelerator video processing such as an image signal processor, a video codec, etc. Any set of constants may be shared for various embodiments of the hardware accelerator. Shared data may also be shared input and/or output data if the tasks are operating on the same data or one task is providing data to another task. Still further, the shared data may include the instruction words themselves, as one mechanism for communicating instruction words from the CPU processors 30 to the hardware coprocessor(s) 16. On the other hand, section 2 may have the data that is private to task 1 and task 3, when those tasks are executing, and sections 2 and 3 may have the data that is private to task 2.

Figure 7:
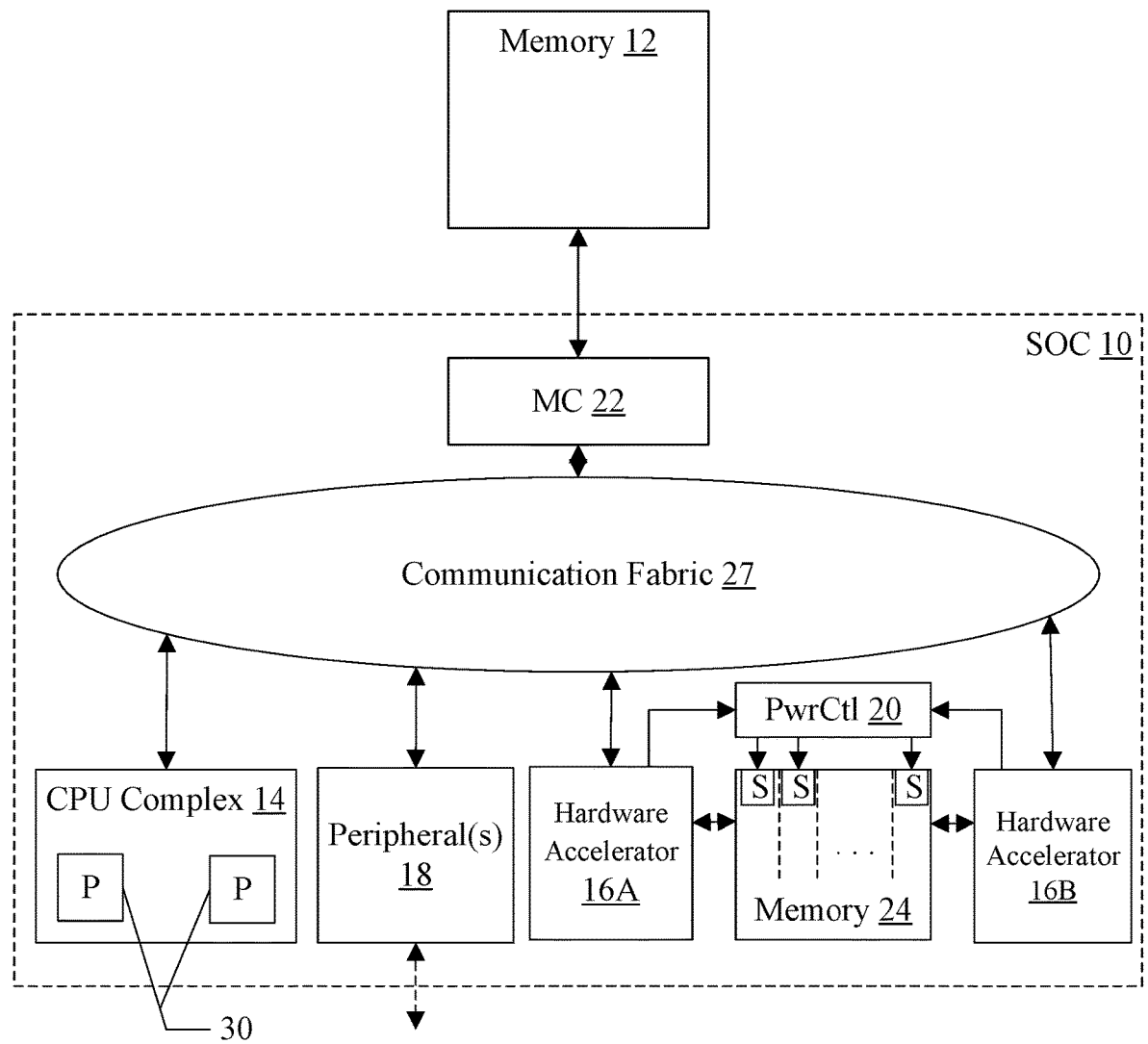
FIG. 7 is a block diagram of another embodiment of an SOC.

As mentioned previously, the hardware accelerators 16 may be one or more hardware accelerators. FIG. 7 illustrates an embodiment of the SOC 10 in which there are two hardware accelerators 16A-16B coupled to the communication fabric 27, to the memory 24, and to the power control circuit 20. The remaining components 12, 22, 14, and 18 may be similar to the embodiment of FIG. 1.

When multiple hardware accelerators share the same memory 24, two or more of the hardware accelerators may receive an instruction word concurrently and may provide a memory power field to the power control circuit 20. The power control circuit 20 may be configured to power the sections of the memory 24 to provide sufficient memory for the instruction words. That is, a first instruction word received by the hardware accelerator 16A may have a first memory power field specifying a first amount of memory, and a second instruction word received by the hardware accelerator 16B may have a second memory power field specifying a second amount of memory. The power control circuit 20 may be configured to selectively power the plurality of sections of the memory 24 to provide sufficient memory for the first instruction word and the second instruction word based on the first memory power field and the second memory power field. The power control circuit 20 may power disjoint sets of sections for each hardware accelerator 16A-16B (e.g. if a size of memory is specified in the first and second memory power fields and the hardware accelerators 16 do not expect to share memory 24), or may overlap the sections (e.g. if the sections are directly specified in the first and second memory power fields). In the case that the sections overlap, the programmers/compilers that produce the instruction words may be aware of the overlap and take appropriate software measures to share the memory predictably (e.g. semaphores or other handoff mechanisms). Thus, the memory power control circuit 20 may be configured to take the union of the power control fields to determine which sections of the memory 24 to power up, or may assign disjoint sets of sections to each power control field (and thus the corresponding hardware accelerator 16A-16B).

Figure 8:
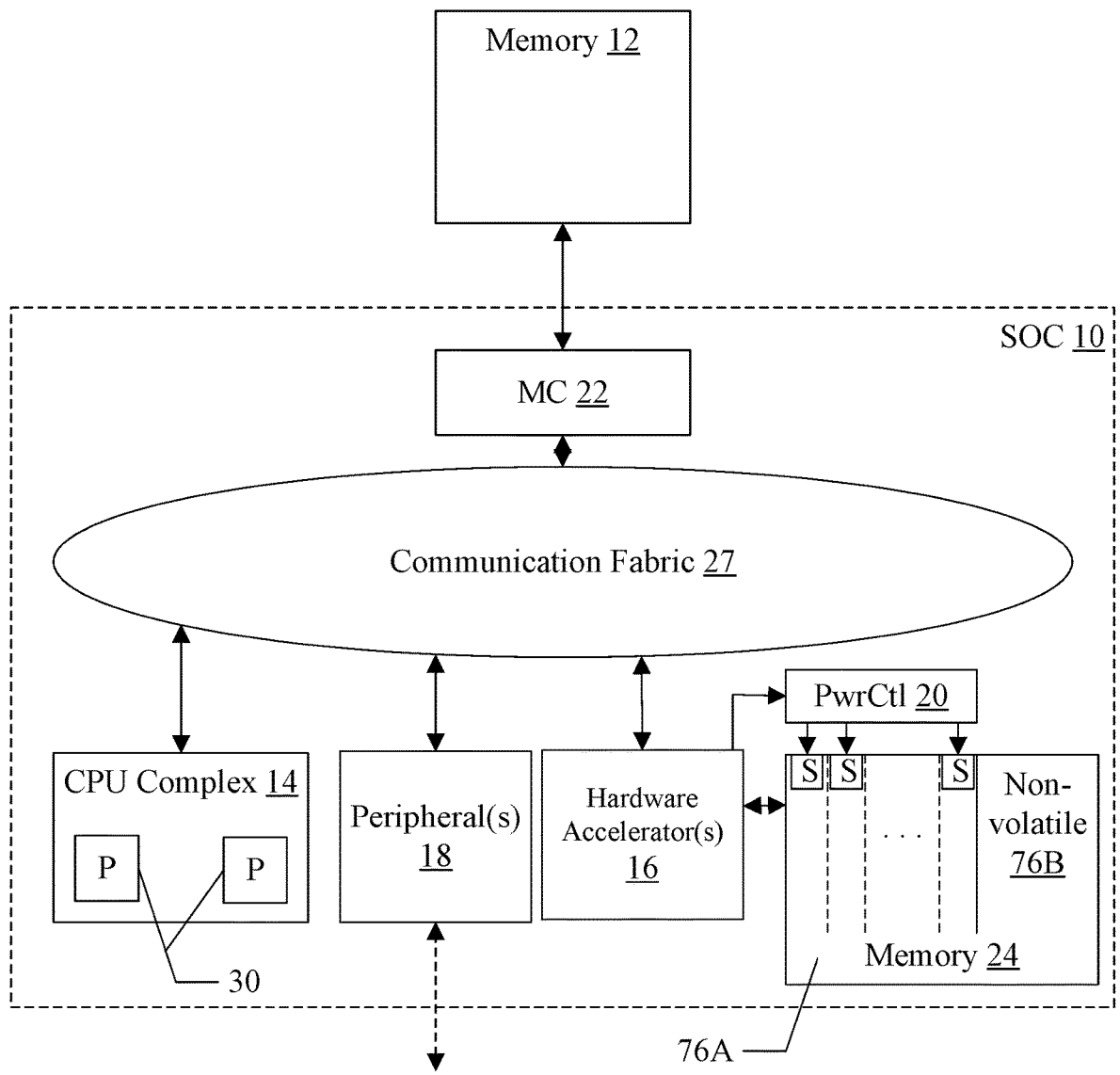
FIG. 8 is a block diagram of still another embodiment of an SOC.

FIG. 8 is another embodiment of the SOC 10, similar to the embodiment of FIG. 1 except that the memory 24 has a volatile portion 76A and a non-volatile portion 76B. The volatile portion is controlled by the power control circuit 20, while the non-volatile portion may be powered directly (or may not require power when idle). Generally, a volatile memory, or volatile portion 76A of memory, may retain the data stored in the memory as long as power is supplied. If the volatile memory/volatile portion is powered down or powered off, the data is lost (not retained). A non-volatile memory, on the other hand, may retain data even if no power is supplied. The non-volatile memory may generally retain data indefinitely, until it is either intentionally overwritten or unit a failure in the non-volatile memory occurs (e.g. to wear out over time).

While the memory 24 shown in FIG. 8 includes a volatile portion 76A and a non-volatile portion 76B, generally any number of volatile and/or non-volatile portions may be included in various embodiments. Thus, more generally, a memory 24 may include a plurality of portions, were at least a first portion of the plurality of portions is non-volatile and at least a second portion of the plurality of portions is volatile.

The volatile portion 76A may comprise any form of volatile memory. Examples of volatile memory may include static random access memory (SRAM), dynamic random access memory (DRAM), etc. In the illustrated embodiment, the volatile portion 76A is divided into sections and controlled by the power control circuit 20 according to the memory power field 32 in each instruction word 36, as discussed above. In other embodiments, the volatile portion 76A may not be divided into sections (e.g. the volatile portion may effectively have one section that is powered up or powered down as a unit).

The non-volatile portion 76B may comprise any form of non-volatile memory. Examples of non-volatile memory may include magnetic RAM (MRAM), Flash memory such as NAND Flash or NOR Flash, resistive RAM (ReRAM or RRAM), phase change memory (PCM), conductive bridge RAM (CBRAM), spin transfer torque (STT) RAM, Ferroelectric RAM (FRAM or FeRAM), Silicon Oxide Nitride Oxide Silicon (SONOS) memory, or NanoRAM (memory made from nanostructures such as nanowires).

The non-volatile portion 76B may be used to store data that is reused each time a task is performed. For example, the non-volatile portion may be used to store various constants, such as the examples of constants mentioned above. The non-volatile portion may also store instruction words, in some embodiments. By storing data that is reused by various tasks in the non-volatile portion 76B, the time to perform each task may be reduced since the non-volatile portion 76B retains data between power down/power up cycles and thus need not be reloaded each time the volatile portion 76A is powered up. After the non-volatile portion 76B has been initialized, the time that the hardware accelerators 16 and the volatile portion 76A remain powered down may increase due to the reduced processing time.

Figure 9:
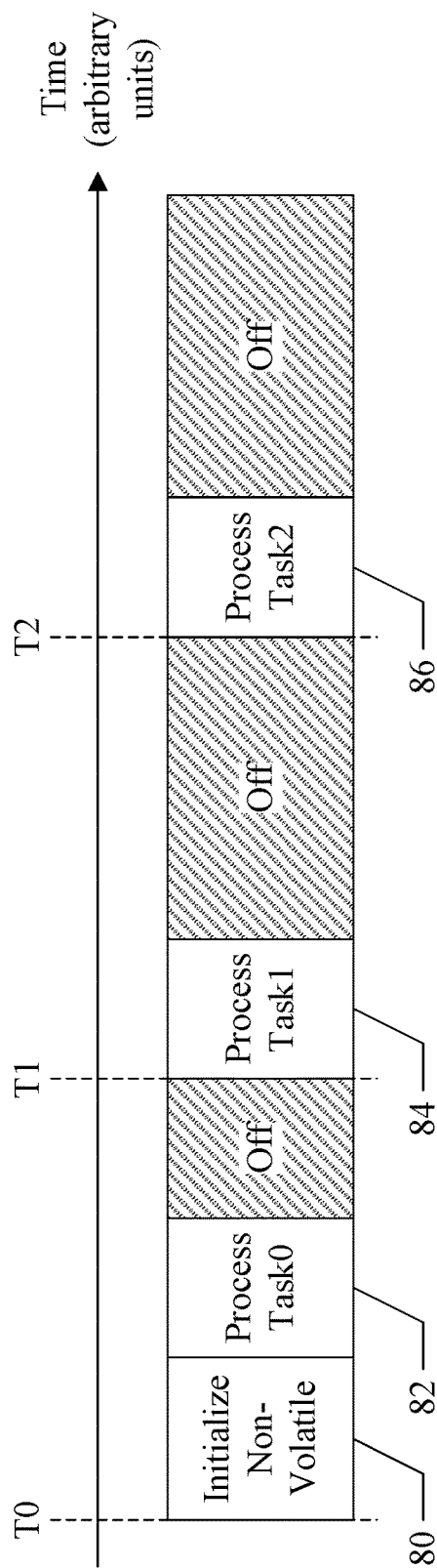
FIG. 9 is a timeline illustrating performance of several tasks on one embodiment of the hardware accelerator.

FIG. 9 is a timeline illustrating the performance of various tasks on a hardware accelerator 16 using the memory 24 in FIG. 8. Time increases from left to right in FIG. 9, and various points in time are shown (T0, T1, T2, etc.). In an embodiment, T0, T1, and T2 may be regularly spaced in time (e.g. the interval lengths may be regular). For example, in the case of video processing, the points in time may be based on the frame rate. At a first time T0, the hardware accelerator(s) 16 and the memory 24 may be powered on for an initial iteration (e.g. the first iteration since the SOC 10 was powered up most recently). For this iteration, the non-volatile portion 76B of the memory 24 may be initialized with the (relatively) static data that is to be reused over one or more iterations (reference numeral 80). It is certainly possible to change the data in the non-volatile portion 76B. For example, the constants that may be stored in the non-volatile portion 76B may be updated after some iterations (but not necessarily all iterations). In the case of a neural network model, for example, the constants may be updated to reflect new weights for the model as the model learns "on the fly" from new data. The updates may be periodic, or based on a detection that certain inputs have led to a learning that changes one or more weights. However, the data stored in the non-volatile portion 76B may be expected to remain relatively constant over most iterations.

Once the non-volatile portion 76B is initialized, the hardware accelerator 16 may process a first task (Task0) by performing (or executing) one or more instruction words 36 provided to the hardware accelerator 16 by the CPU processors 30 (reference numbers 80). Processing the task may include loading data into the volatile portion 76A of the memory 24 (if needed), performing the processing on the data, possibly writing results to the volatile portion 76A, and writing the results from the non-volatile portion out to another location (e.g. the non-volatile portion 76B or to the memory 12) (if needed). The hardware accelerator 16 and the memory 24 may be powered off for the remainder of the interval until time T1 occurs (crosshatched area in FIG. 9).

At time T1, the hardware accelerator 16 and the memory 24 may be powered up again to perform another task comprising one or more instruction words (Task2). Task2 may be the same task as Task1, or may be a different task that reuses the data in the non-volatile portion 76B. Accordingly, the loading/initializing of data in the non-volatile portion 76B need not be performed again, and the hardware accelerator 16 may being processing Task2 (reference numeral 84). As with Task1, processing Task2 may include loading data into the volatile portion 76A of the memory 24 (if needed), performing the processing on the data, possibly writing results to the volatile portion 76A, and writing the results from the non-volatile portion out to another location (e.g. the non-volatile portion 76B or to the memory 12) (if needed). The hardware accelerator 16 and the memory 24 may be powered off for the remainder of the interval until time T2 occurs (crosshatched area in FIG. 9). Comparatively, the off time between T1 and T2 may be larger than the off time between T0 and T1.

At time T2, the processing may be similar to time T1. The hardware accelerator 16 and the memory 24 may be powered up again to perform another task comprising one or more instruction words (Task3—reference numeral 86). Task3 may be the same task as Task1 and/or Task2, or may be a different task that reuses the data in the non-volatile portion 76B. As with Task1 and Task2, processing Task23 may include loading data into the volatile portion 76A of the memory 24 (if needed), performing the processing on the data, possibly writing results to the volatile portion 76A, and writing the results from the non-volatile portion out to another location (e.g. the non-volatile portion 76B or to the memory 12) (if needed). The hardware accelerator 16 and the memory 24 may be powered off for the remainder of the interval until time T3 occurs (not shown in FIG. 9).

Figure 10:
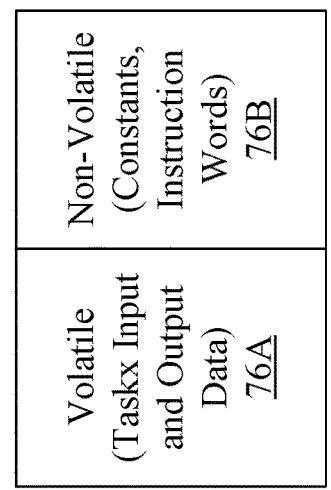
FIG. 10 is a block diagram illustrating contents of a local memory for one embodiment.

FIG. 10 is a block diagram illustrating the contents of the memory 24 for one embodiment. As mentioned above, the volatile portion 76A may store data that may change from iteration to iteration of the tasks performed by the hardware accelerator 16. For example, the task input and output data may be stored. The non-volatile portion 76B may store data that may be relatively static from iteration to iteration (e.g. constants and/or instruction words). The data may be updated from time to time (e.g. constants may be changed, or the instruction words may be updated).

Figure 11:
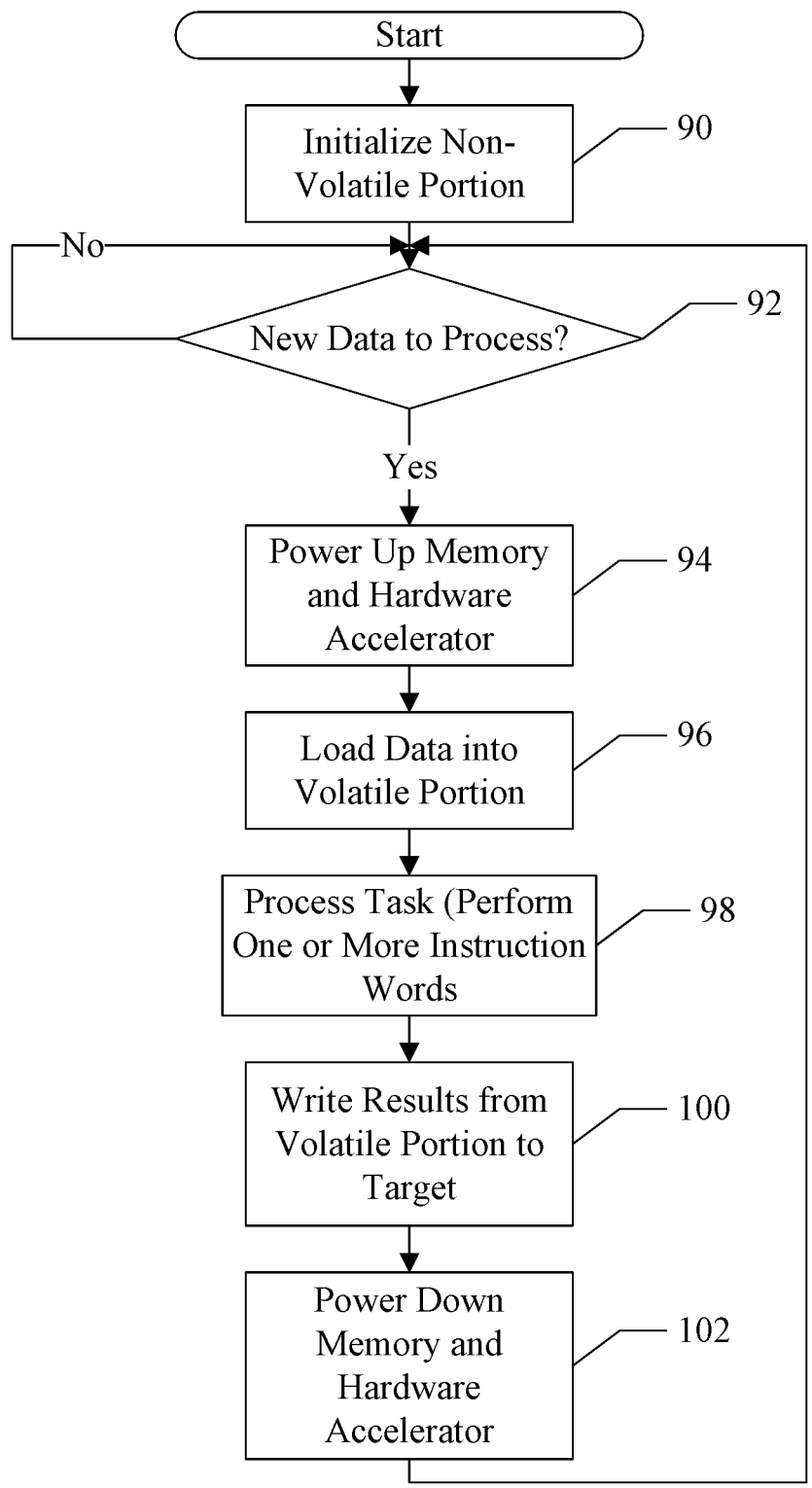
FIG. 11 is a flowchart illustrating operation of one embodiment of the SOC shown in FIG. 8.

FIG. 11 is a flowchart illustrating operation of one embodiment of the SOC 10 to perform tasks on the hardware accelerator 16. While the blocks are shown in a particular order for ease of understanding, other orders may be used. Blocks or a series of blocks may be independent of each other and may be performed in either order or in parallel. For example, block 90 may be independent of blocks 94 and 96 and may be performed before, in parallel with, or after an initial performance of blocks 94 and 96. Blocks may be performed in parallel in combinatorial logic circuitry in the hardware accelerator 16. Blocks, combinations of blocks, and/or the flowchart as a whole may be pipelined over multiple clock cycles. The hardware accelerator 16 may be configured to implement the operation shown in FIG. 11.

Prior to or in parallel with the start of an initial iteration of performing a task, the hardware accelerator 16 (or software executing on a CPU processor 30) may initialize data in the non-volatile portion 76B of the memory 24 (block 90). For example, constants maybe loaded from memory 12 or another source into the non-volatile portion 76B, one or more instruction words may be loaded from memory into the non-volatile portion 76B, etc.

The hardware accelerator 16 and the memory 24 may be off until data is received to be processed (decision block 92, "no" leg). Once data is ready to be processed (e.g. received) (decision block 92, "yes" leg), the hardware accelerator 16 and the memory 24 may be powered up (block 94). The data to be processed (e.g. input data) may be loaded into the volatile portion 76A of the memory 24 (block 96). The task may be processed by the hardware accelerator 16 (e.g. performing one or more instruction words on the data in the volatile portion 76A and the non-volatile portion 76B as appropriate) (block 98). During the processing of the task, results and/or intermediate results (e.g. output) may be written to the volatile portion 76A. Final results, if the results are to be retained or accessed by another component on the SOC 10, may be written from the volatile portion 76A to a target (block 100). For example, the target may be the non-volatile portion 76B, the memory 12, or another target such as an external non-volatile or volatile memory. If the non-volatile portion 76B is the target, the results may be written to the non-volatile portion 76B as they are generated. Subsequent to processing the task (e.g. performing the one or more instruction words), the memory 24 and the hardware accelerator may be powered down (or off) (block 102) until the next iteration is to be performed (e.g. additional data is received, decision block 92).

As mentioned above, the initialization may be performed, in some cases, during an initial power up of the hardware accelerator 16 and the memory 24 (e.g. in parallel with powering up the hardware accelerator 16 and the volatile portion 76A and loading data into the volatile portion 76A, blocks 94 and 96). That is, the processing of instruction words (e.g. blocks 94, 96, 98, 100, and 102) are performed for a plurality of iterations and the initializing may be performed during a first one of the plurality of iterations but not during subsequent ones of the plurality of iterations. In this manner, a first amount of time between the power and the powering down may be longer during the first one of the plurality of iterations than a second amount of time between the powering and the powering down during other ones of the plurality of iterations. Each iteration may be performed at a different point in time in response to receiving respective data to be operated upon, and wherein the data loaded into the volatile portion of the memory comprises the respective data.

System

Figure 12:
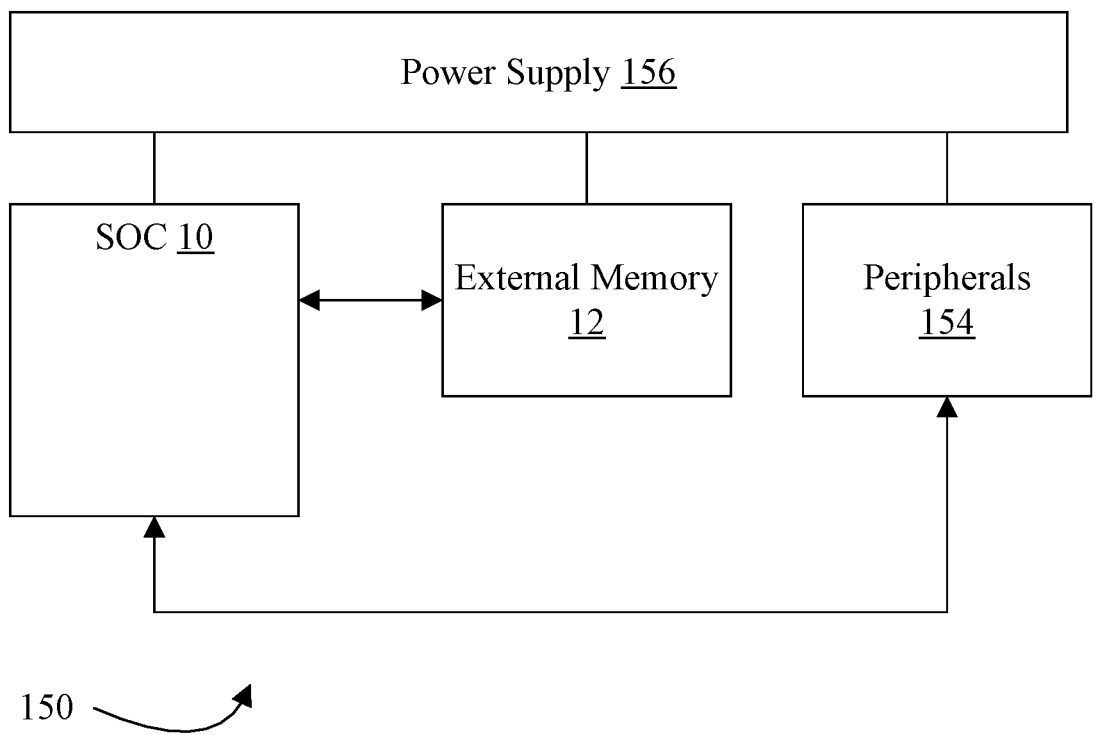
FIG. 12 is a block diagram of one embodiment of a system.

Turning next to FIG. 12, a block diagram of one embodiment of a system 150 is shown. In the illustrated embodiment, the system 150 includes at least one instance of the system on a chip (SOC) 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Computer Readable Storage Medium

Turning now to FIG. 13, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 13 may store a database 204 representative of the SOC 10. Generally, the database 204 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 204 on the computer accessible storage medium 200 may be the netlist (with or without the synthesis library) or the data set, as desired.

While the computer accessible storage medium 200 stores a representation of the SOC 10, other embodiments may carry a representation of any portion of the SOC 10, as desired, including any subset of the CPU complex 14 or portions thereof, the memory controller 22 or portions thereof, the communication fabric 27, the peripherals 18 or portions thereof, the hardware accelerator(s) 16 or portions thereof, the power control circuit 20 or portions thereof, the memory 24 or portions thereof, other components and/or peripherals, or portions thereof, etc. The database 204 may represent any portion of the above.

In accordance with the above disclosure, in one embodiment an apparatus comprises one or more processors forming central processing units (CPUs); one or more hardware accelerators coupled to the one or more processors; a memory coupled to the one or more hardware accelerators and dedicated to the one or more hardware accelerators; and a power control circuit coupled to the one or more hardware accelerators and the memory. The hardware accelerator may be configured to perform a predefined set of operations based on instruction words from the one or more processors. The memory may be divided into a plurality of sections that are individually powerable and the power control circuit may be configured to selectively power the plurality of sections. A first instruction word received by a given hardware accelerator of the one or more hardware accelerators may include a first field that specifies an amount of the memory that is used when processing the first instruction word, and the power control circuit may be configured to power a subset of the plurality of sections to provide sufficient memory for the first instruction word based on the first field while one or more of the plurality of sections are powered off. In an embodiment, a given section of the plurality of sections may include one or more power switches coupled between a power supply and a plurality of memory cells in the given section, and the power control circuit may be configured to control the one or more power switches to selectively power the given section. In an embodiment, the power control circuit may be configured to power a default amount of the memory based on the first field not being populated. In another embodiment, the power control circuit may be configured to power each of the plurality of sections based on the first field not being populated. In an embodiment, a second instruction word received by the given hardware accelerator may include a second field that specifies a second amount of the memory, and the power control circuit may be configured to adjust which of the plurality of sections are powered on based on the second field. In an embodiment, one or more of the plurality of sections remain powered between the first instruction word and the second instruction word, and the data in the one or more of the plurality of sections is used in processing the first instruction word and the second instruction word. In an embodiment, the given hardware accelerator may be configured to detect an access to one of the one or more of the plurality of sections that are powered off during execution of the first instruction word, and the given hardware accelerator may be configured to prevent the access. In an embodiment, the given hardware accelerator may be configured to terminate execution of the first instruction word based on detecting the access. In an embodiment, a second instruction word received by a second hardware accelerator of the one or more hardware accelerators concurrent with the first instruction word in the given hardware accelerator may include a second field, and the power control circuit may be configured to selectively power the plurality of sections to provide sufficient memory for the first instruction word and the second instruction word based on the first field and the second field. In an embodiment, the first field may directly specify the subset of the plurality of sections and one or more of the plurality of sections that are powered off.

In an embodiment, a method comprises receiving a first instruction word in a first hardware accelerator that is coupled to a memory that is dedicated to one or more hardware accelerators including the first hardware accelerator. The memory may be divided into a plurality of sections that are individually powerable, and the first instruction word may include a first field that specifies an amount of the memory that is used when processing the first instruction word. The method further comprises powering a subset of the plurality of sections to provide sufficient memory for the first instruction word while one or more of the plurality of sections are powered off, based on the first field. In an embodiment, the subset may be a default amount of the memory based on the first field not being populated. In an embodiment, the method further comprises powering each of the plurality of sections based on the first field not being populated. In an embodiment, the method further comprises receiving a second instruction word in the first hardware accelerator, wherein the second instruction word may include a second field that specifies a second amount of the memory. The method may still further comprise adjusting which of the plurality of sections are powered on based on the second field. In an embodiment, one or more of the plurality of sections remain powered between the first instruction word and the second instruction word, and data in the one or more of the plurality of sections is used in processing the first instruction word and the second instruction word. In an embodiment, the first field directly specifies the subset of the plurality of sections and one or more of the plurality of sections that are powered off.

In an embodiment, apparatus comprises: at least one hardware accelerator; a memory coupled to the at least one hardware accelerator and dedicated to the at least one hardware accelerator; and a power control circuit coupled to the at least one hardware accelerator and the memory, wherein the power control circuit is configured to independently control power to a plurality of sections of the memory. A first instruction word received by the at least one hardware accelerator may include a first field that specifies an amount of the memory that is used when processing the first instruction word, and the power control circuit may be configured to power a portion of the memory to provide sufficient storage for the first instruction word based on the first field while a remaining portion of the memory is powered off. In an embodiment, the power control circuit may be configured to power a default portion of the memory based on the first field not being populated. In an embodiment, the power control circuit may be configured to power the portion and the remaining portion based on the first field not being populated. In an embodiment, the first field may directly specify the portion and/or the remaining portion.

In an embodiment, an apparatus comprises: one or more processors forming central processing units (CPUs); at least one hardware accelerator coupled to the one or more processors and configured to perform a predefined set of operations based on instruction words from the one or more processors; and a memory coupled to the at least one hardware accelerator and dedicated to the at least one hardware accelerator. The memory may be divided into a plurality of portions, wherein at least a first portion of the plurality of portions is non-volatile and at least a second portion of the plurality of portions is volatile. The non-volatile portion may be loaded with data during use and retains the data when the at least one hardware accelerator and the memory are powered down, and the volatile portion does not retain data when powered down. In an embodiment, the non-volatile portion comprises magnetic random access memory. In another embodiment, the non-volatile portion comprises resistive random access memory. In still another embodiment, the non-volatile portion comprises spin transfer torque random access memory. In still another embodiment, the non-volatile portion comprises ferroelectric random access memory. In yet another embodiment, the non-volatile portion comprises silicon oxide nitride oxide silicon (SONOS) memory. In an embodiment, the volatile portion comprises static random access memory.

In an embodiment, a method comprises powering at least one hardware accelerator and a memory coupled to the at least one hardware accelerator to perform one or more instruction words provided by one or more central processing units (CPUs). The memory comprises at least a volatile portion and a non-volatile portion. The non-volatile portion is configured to retain data during times that the memory is powered down. The method further comprises loading data into the volatile portion of the memory; performing the one or more instruction words using data stored in the volatile portion and the non-volatile portion; and powering down the at least one hardware accelerator and the memory subsequent to performing the one or more instruction words. In an embodiment, the method further comprises initializing the non-volatile portion during an initial power up of the at least one hardware accelerator and the memory. In an embodiment, the powering, loading, performing, and powering down are performed a plurality of iterations and the initializing is performed during a first one of the plurality of iterations but not during subsequent ones of the plurality of iterations. In an embodiment, the powering, loading, performing, and powering down are performed a plurality of iterations and the initializing is performed during a first one of the plurality of iterations, whereby a first amount of time between the power and the powering down is longer during the first one of the plurality of iterations than a second amount of time between the powering and the powering down during other ones of the plurality of iterations. In an embodiment, the data in the non-volatile portion may include constants used during the processing of the one or more instruction words. In an embodiment, the data in the non-volatile portion further includes the one or more instruction words. In an embodiment, the data in the volatile portion includes input data to be processed. In an embodiment, the volatile portion comprises output data resulting from the performing of the one or more instruction words.

In an embodiment, a method comprises initializing a non-volatile portion of a memory that is coupled to at least one hardware accelerator and is dedicated to the at least one hardware accelerator; and subsequent to the initializing, iterating: powering the at least one hardware accelerator and the memory to perform one or more instruction words; loading data into the volatile portion of the memory; performing the one or more instruction words using data stored in the volatile portion and the non-volatile portion; and powering down the at least one hardware accelerator and the memory subsequent to performing the one or more instruction. In an embodiment, the one or more instruction words may be stored in the non-volatile portion. In an embodiment, the non-volatile portion may store one or more constants used in the performing. In an embodiment, each iteration may be performed at a different point in time in response to receiving respective data to be operated upon, and wherein the data loaded into the volatile portion of the memory comprises the respective data. In an embodiment, the method further comprises writing one or more results of the one or more instruction words to the volatile portion. In an embodiment, the method may further comprise, during a first iteration of the power, loading, performing, and powering down: updating data in the non-volatile portion.

Numerous variations and modifications will become apparent to those skilled in the art once the above disclosure is fully appreciated. It is intended that the following claims be interpreted to embrace all such variations and modifications.

What is claimed is:

1. An apparatus comprising:
one or more processor circuits;
a hardware accelerator circuit coupled to the one or more processor circuits, wherein the hardware accelerator circuit is configured to perform operations based on instruction words received from the one or more processor circuits;
a memory coupled to the hardware accelerator circuit, wherein the memory is dedicated to the hardware accelerator circuit, and wherein the memory includes a non-volatile portion reserved for storing data of a first type and a volatile portion reserved for storing data of a second type, wherein the volatile portion is divided into a plurality of sections; and
a power control circuit configured to, during performance of a task specified by a given instruction word provided by one of the one or more processor circuits, cause selected ones of the plurality of sections specified by a power field of the given instruction word to be powered on.

2. The apparatus of claim 1, wherein the non-volatile portion of the memory is configured to retain storage of data of the first type when powered down, and wherein the plurality of sections of the volatile portion of the memory do not retain storage of data of the second type when powered down.

3. The apparatus of claim 1, wherein data of the first type comprises data, used by the hardware accelerator circuit, that does not vary for a plurality of iterations, and wherein data of the second type comprises data, used by the hardware accelerator circuit, that varies over the plurality of iterations.

4. The apparatus of claim 3, wherein data of the first type includes constants used in ones of the plurality of iterations.

5. The apparatus of claim 3, wherein data of the first type includes instruction words.

6. The apparatus of claim 1, wherein, for a first task specified by a first instruction word, the power control circuit is configured to power on a first subset of the plurality of sections of the volatile portion, and wherein for a second, subsequent task specified by a second instruction word, the power control circuit is configured to power on a second subset of the plurality of sections, wherein the second subset is different from the first subset.

7. The apparatus of claim 1, wherein the power control circuit is configured to power off ones of the plurality of sections of the volatile portion not specified by the power field of the given instruction word.

8. The apparatus of claim 1, wherein the power control circuit is configured to power down the plurality of sections of the volatile portion between tasks.

9. The apparatus of claim 1, wherein the non-volatile portion of the memory comprises a magnetic random access memory.

10. The apparatus of claim 1, wherein the non-volatile portion of the memory comprises a resistive random access memory.

11. A method comprising:
conveying, from a processor circuit to a hardware accelerator circuit, a first instruction word specifying operations to be performed by the hardware accelerator circuit;
conveying, to a power control circuit, a power control field of the first instruction word;
storing, in a non-volatile portion of a memory, data of a first type;
powering on, by the power control circuit, one or more of a plurality of sections of a volatile portion of the memory, wherein the volatile portion of the memory is reserved for storing data of a second type, and wherein the one or more of the plurality of sections are specified by the power control field;
loading data of the second type into the volatile portion; and
performing, by the hardware accelerator circuit and using data of the first type and the second type, a task specified by a task field of the first instruction word.

12. The method of claim 11, further comprising:
subsequent to completing the task specified by the task field of the first instruction word, the power control circuit powering off the volatile and non-volatile portions of the memory; and
continuing to store data of the first type in the non-volatile portion of the memory subsequent to the powering off, wherein the data of the second type is not stored in the volatile portion of the memory subsequent to the powering off.

13. The method of claim 11, further comprising:
powering on a first subset of the plurality of sections of the volatile portion of the memory to perform the task specified by the task field of the first instruction word; and
powering on a second subset of the plurality of sections of the volatile portion to perform a task specified by a task field of a second instruction word, wherein the second subset is different from the first subset.

14. The method of claim 11, further comprising maintaining one or more of the plurality of sections of the volatile portion in a power off state during performing of the task specified by the task field of the first instruction word, wherein the power control field specifies which of the plurality of sections of the volatile portion are to be powered on and which are to be powered off during performance of the task.

15. The method of claim 11, further comprising the power control circuit powering down the non-volatile portion of the memory when the hardware accelerator circuit is powered down.

16. The method of claim 11, wherein data of the first type includes data that is used for a plurality of iterations of operations performed by the hardware accelerator circuit, and wherein data of the second type includes data that varies over the plurality of iterations.

17. The method of claim 11, further comprising writing, using the hardware accelerator circuit to the one or more of the plurality of sections of the volatile portion of the memory, results from performing of the task.

18. A system comprising:
a processor circuit;
a hardware accelerator circuit configured to execute a task specified by an instruction word received from ones of the processor circuit;
a memory including a non-volatile portion and a volatile portion, wherein the hardware accelerator circuit is configured to, during execution of given task, access data of a first type from the non-volatile portion and data of a second type from the volatile portion, wherein the volatile portion includes a plurality of sections; and
a power control circuit configured to independently power on and power off ones of the plurality of sections of the volatile portion in accordance with a power field in the instruction word, wherein the hardware accelerator circuit is configured to access the data of the second type during the execution of the given task;
wherein the power control circuit is further configured to power down the memory subsequent to execution of the task; and
wherein the non-volatile portion of the memory is configured to continue storing the data of the first type when the memory is powered down, and wherein the volatile portion of the memory is configured to discontinue storing data of the second type when the memory is powered down.

19. The system of claim 18, wherein the data of the first type includes data that does not vary over a plurality of iterations, and wherein data of the second type includes data that varies from one iteration to a next iteration.

20. The system of claim 18, wherein the power control circuit is configured to, for a first instruction word having a first power field, power on a first subset of the plurality of sections of volatile portion, and, for a second instruction word having a second power field, power on a second subset of the plurality of sections, wherein the first and second subsets are different.

* * * * *